(12) United States Patent
Jin et al.

(10) Patent No.: US 11,487,952 B2
(45) Date of Patent: Nov. 1, 2022

(54) METHOD AND TERMINAL FOR GENERATING A TEXT BASED ON SELF-ENCODING NEURAL NETWORK, AND MEDIUM

(71) Applicant: PING AN TECHNOLOGY (SHENZHEN) CO., LTD., Guangdong (CN)

(72) Inventors: Ge Jin, Guangdong (CN); Liang Xu, Guangdong (CN); Jing Xiao, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 372 days.

(21) Appl. No.: 16/637,274

(22) PCT Filed: Jun. 26, 2019

(86) PCT No.: PCT/CN2019/092957
§ 371 (c)(1),
(2) Date: Feb. 7, 2020

(87) PCT Pub. No.: WO2020/119069
PCT Pub. Date: Jun. 18, 2020

(65) Prior Publication Data
US 2021/0165970 A1     Jun. 3, 2021

(30) Foreign Application Priority Data
Dec. 13, 2018 (CN) .......................... 201811526185.4

(51) Int. Cl.
*G06F 40/40* (2020.01)
*G06N 3/04* (2006.01)
*G06N 3/08* (2006.01)

(52) U.S. Cl.
CPC ............... *G06F 40/40* (2020.01); *G06N 3/04* (2013.01); *G06N 3/08* (2013.01)

(58) Field of Classification Search
CPC ............ G06F 40/40; G06N 3/04; G06N 3/08
See application file for complete search history.

(56) References Cited

U.S. PATENT DOCUMENTS

| 11,243,944 B2 * | 2/2022 | Zhang .................. G06F 40/30 |
| 2018/0075014 A1 * | 3/2018 | Duan .................. G06N 5/022 |

FOREIGN PATENT DOCUMENTS

| CN | 105930314 A | 9/2016 |
| CN | 107562718 A | 1/2018 |

(Continued)

OTHER PUBLICATIONS

Li and Wang et al., Effective Representing of Information Network by Variational Autoencoder, IJCAI, 2017, p. 2104-2016 (Year: 2017).*

(Continued)

*Primary Examiner* — Sonia L Gay (57) ABSTRACT

The present disclosure relates to the technical field of natural language understanding, and provides a method, a terminal and a medium for generating a text based on a self-encoding neural network. The method includes: obtaining a text word vector and a classification requirement of a statement to be input; reversely inputting the text word vector into a trained self-encoding neural network model to obtain a hidden feature of an intermediate hidden layer of the self-encoding neural network model; modifying the hidden feature according to a preset classification scale and the classification requirement; defining the modified hidden feature as the intermediate hidden layer of the self-encoding neural network model, and reversely generating a word vector corresponding to an input layer of the self-encoding neural (Continued)

network model by the intermediate hidden layer; and generating the corresponding text, according to the generated word vector.

17 Claims, 4 Drawing Sheets

(56) References Cited

FOREIGN PATENT DOCUMENTS

| | | |
|---|---|---|
| CN | 107844469 A | 3/2018 |
| CN | 108334497 A | 7/2018 |
| CN | 108763191 A | 11/2018 |
| WO | 2018213840 A1 | 11/2018 |

OTHER PUBLICATIONS

Patidar et al., Correcting Linguistic Training Bias in an FAQ-bot using LSTM-VAE, Proceedings of DMNLP, Workshop at ECML/PKDD, Skopje, Macedonia, 2017, whole document (Year: 2017).*
Lee et al., Scalable Sentiment for Sequence-to-Sequence Chatbot Response With Performance Analysis, ICASSP, Apr. 15-20, 2018, whole document (Year: 2018).*

* cited by examiner

METHOD AND TERMINAL FOR GENERATING A TEXT BASED ON SELF-ENCODING NEURAL NETWORK, AND MEDIUM

CROSS REFERENCE TO RELATED APPLICATION

The present disclosure is the National Stage of International Application No. PCT/CN2019/092957, filed on Jun. 26, 2019, which claims the priority of Chinese Patent Application No. 201811526185.4, entitled "METHOD, DEVICE, AND TERMINAL FOR GENERATION A TEXT BASED ON SELF-ENCODING NEURAL NETWORK, AND MEDIUM", filed on Dec. 13, 2018, which is hereby incorporated by reference in its entirety.

TECHNICAL FIELD

The present disclosure relates to the technical field of natural language understanding, in particular to a method, and a terminal for generating a text based on a self-encoding neural network, and a medium.

BACKGROUND

Automatic text generation is an important research aspect in the field of natural language processing. Realizing the automatic text generation is also an important maturity sign of artificial intelligence. The text generation applications can be divided into supervised text generation application and unsupervised text generation application. The supervised text generation application includes machine translation, intelligent question answering system, dialogue system, and text summarization. The unsupervised text generation application, such as poetry creation and musical creation, etc., is configured to learn the original data distribution, then generate the sample which is similar to the original data. Through the text generation, the human-computer interaction process would become more intelligent and natural. And the news can be written and published automatically through replacing human editors with the automatic text generation system.

However, the existing text generation model, such as the adversarial generation model, requires a large amount of data annotation resources and modeling resources.

SUMMARY

The main objective of the present disclosure is to provide a method, a device, and a terminal for generating a text based on a self-encoding neural network, and a medium, aiming at solving the technical issues that in the related art a large amount of data annotation resources and modeling resources are required to generate the text model.

In order to achieve the above objective, the present disclosure provides a method for generating a text based on a self-encoding neural network, including the following operations:

obtaining a text word vector and a classification requirement of a statement to be input;

reversely inputting the text word vector into a trained self-encoding neural network model to obtain a hidden feature of an intermediate hidden layer of the self-encoding neural network model;

modifying the hidden feature according to a preset classification scale and the classification requirement;

defining the modified hidden feature as the intermediate hidden layer of the self-encoding neural network model, and reversely generating a word vector corresponding to an input layer of the self-encoding neural network model by the intermediate hidden layer; and generating the corresponding text, according to the generated word vector.

In order to achieve the above objective, the present disclosure further provides a terminal, the terminal includes: a processor, a memory, and a computer-readable instruction for generating a text based on a self-encoding neural network. The instruction is stored on the memory and executable on the processor, the instruction is configured to implement the operations of the method for generating a text based on a self-encoding neural network above-mentioned.

In order to achieve the above objective, the present disclosure further provides a storage medium which stores a computer-readable instruction based on the self-encoding neural network for generating text, the instruction when executed by the processor performs operations of the method described above.

The present disclosure obtains the text word vector and the classification requirement of the statement to be input, and reversely inputs the text word vector into the trained self-encoding neural network model to obtain the hidden feature of the intermediate hidden layer of the self-encoding neural network model. The hidden feature is modified according to the preset classification scale and classification requirement. The modified hidden feature is defined as the intermediate hidden layer of the self-encoding neural network model. The word vector corresponding to the input layer of the self-encoding neural network is reversely generated through the intermediate hidden layer, the text is generated according to the generated word vector. The text generation style is adjusted according to the preset classification scale and the classification requirements, without consuming a large amount of data annotation resources and modeling resources.

The implementation, functional feature and advantages of the present disclosure will be further described with reference to the attached drawings in combination with embodiments.

DETAILED DESCRIPTION OF ILLUSTRATIVE EMBODIMENTS

It will be appreciated that the specific embodiments described herein are merely illustrative of the present disclosure and are not intended to limit the disclosure.

Figure 1:
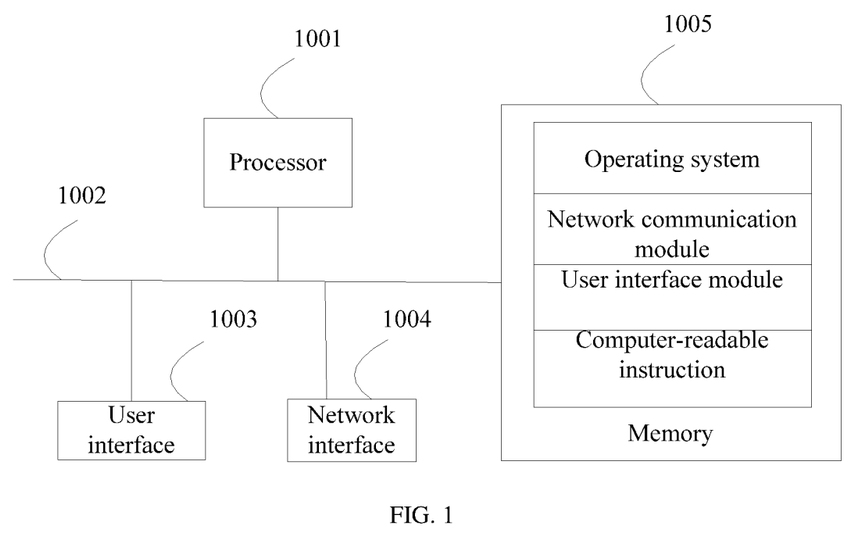
FIG. 1 is a schematic structural diagram of a terminal in a hardware operating environment according to an embodiment of the present disclosure.

Referring to FIG. 1, FIG. 1 is a schematic structural diagram of a terminal in a hardware operating environment according to an embodiment of the present disclosure.

Referring to FIG. 1, the terminal may include a processor 1001, such as a central processing unit (CPU), a communication bus 1002, a user interface 1003, a network interface 1004, and a memory 1005. And the communication bus 1002 being configured to implement connection and communication among these modules. The user interface 1003 may include a display, an input module such as a keyboard, and the optional user interface 1003 may further include a standard wired interface and a wireless interface. The network interface 1004 may optionally include the standard wired interface and the wireless interface (such as a Wireless-Fidelity (Wi-Fi) interface). The memory 1005 may be a high speed Random Access Memory (RAM) memory or a non-volatile memory, such as a disk memory. The memory 1005 can also optionally be a storage device which is independent of the aforementioned processor 1001.

It should be understood by those skilled in the art that the structure illustrated in FIG. 1 does not intended to limit the terminal of the present disclosure, and may include more or less modules than those illustrated, or include a combination of certain modules, or include an arrangement of different modules.

Referring to FIG. 1, the memory 1005 as a storage medium may include an operating system, a data storage module, a network communication module, a user interface module, and a computer-readable instruction for generating a text based on a self-encoding neural network.

In the terminal as shown in FIG. 1, the network interface 1004 is mainly configured to perform the data communication with the network server. The user interface 1003 is mainly configured to perform the data interaction with the user. The processor 1001 and the memory 1005 of the present disclosure may be set in the terminal. The terminal is configured to call the instruction stored on the memory 1005 through the processor 1001, and perform operations of the method provided in the embodiments of the present disclosure.

Figure 2:
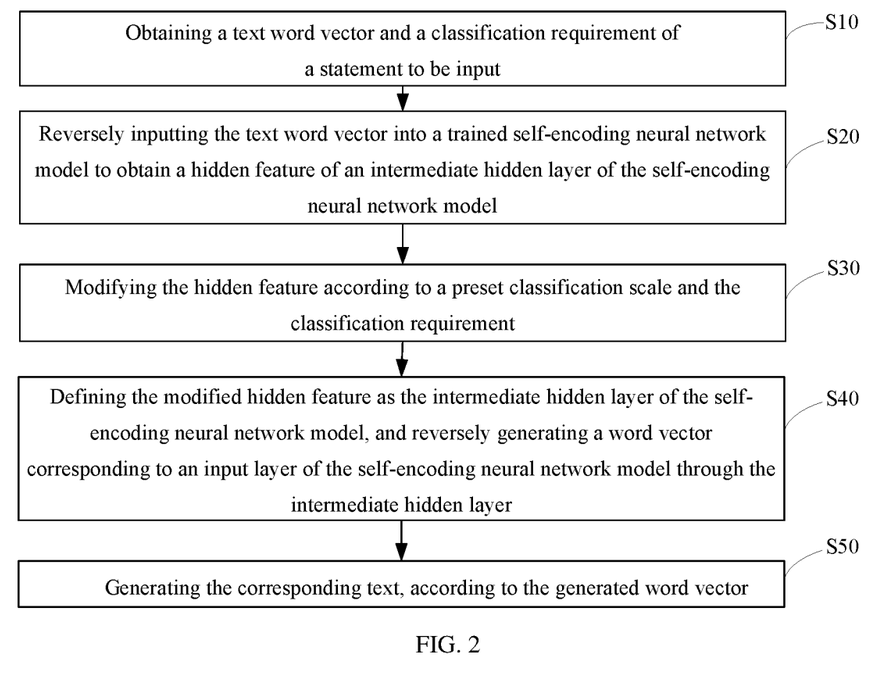
FIG. 2 is a schematic flowchart of a method for generating a text based on a self-encoding neural network according to a first embodiment of the present disclosure.

An embodiment of the present disclosure provides a method for generating a text based on the self-encoding neural network. Referring to FIG. 2, FIG. 2 is a schematic flowchart of a method for generating a text based on a self-encoding neural network according to a first embodiment of the present disclosure.

In the embodiment, the method includes the following operations:

Operation S10: obtaining a text word vector and a classification requirement of a statement to be input;

It should be noted that the execution subject of the method in the present embodiment is a terminal. And the classification requirement generally refers to the desired classification category. Taking an evaluation text as an example, which can be divided into two categories that includes a positive evaluation and a negative evaluation. The classification requirements may be an expectation to output the negative evaluation, or an expectation to output the positive evaluation. Taking an emotional text as another example, which can be divided into a positive emotion and a negative emotion. And taking a friendship text as an example, it can be divided into very friendly, more friendly, generally friendly, and unfriendly. The classification requirement may be obtained by user-defined input, or may be preset, which is not specifically limited herein.

In a specific embodiment, the operations of "obtaining a text word vector of a statement to be input", specifically includes: obtaining the input statement, preprocessing the input statement and obtaining the text word vector of the preprocessed input statement.

The process of preprocessing the input statement generally includes: removing a stop word. The stop word refers to a word which appears multiple times and has little effect on the text, such as Chinese character "的", "地", "得", etc., or the Hyper Text Markup Language (HTML) tag and the scripting language in the web page data set, etc.

For example, if the input text is doc, the corresponding text word vectors are $\{\omega 1, \omega 2, \ldots \omega i\}$, in which oi is the word vector of the $i^{th}$ word in the statement.

Figure 3:
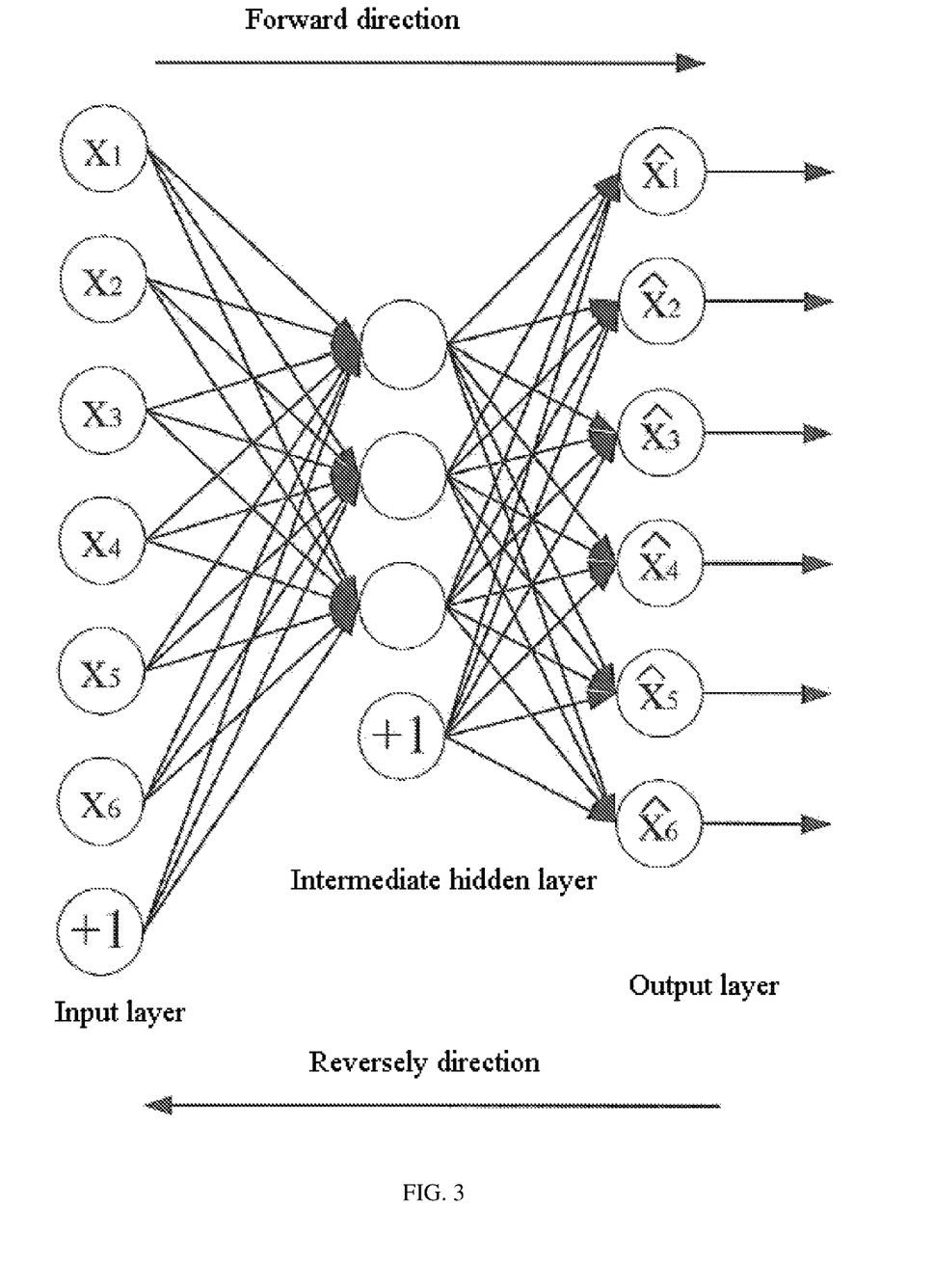
FIG. 3 is a schematic structural diagram of a self-encoding neural network training model according to an embodiment of the present disclosure.

Operation S20: reversely inputting the text word vector into a trained self-encoding neural network model to obtain a hidden feature of an intermediate hidden layer of the self-encoding neural network model;

It should be noted that the operation of reversely inputting the text word vector into a trained self-encoding neural network model to obtain a hidden feature of an intermediate hidden layer of the self-encoding neural network model means that the text word vector is configured as the output vector of the trained self-encoding neural network model to obtain the hidden feature of the intermediate hidden layer reversely (Referring to FIG. 3, FIG. 3 is the situation that the self-encoding neural network model includes one hidden layer, the text word vector is input into the output layer to obtain the hidden feature of the hidden layer located between the input layer and the output layer). When the self-encoding neural network model has multiple hidden layers, the hidden feature obtained of the middlemost hidden layer is taken as the hidden feature of the intermediate hidden layer. For example, when the self-encoding neural network model has three hidden layers, the hidden feature obtained by the second middle layer is taken as the hidden feature of the intermediate hidden layer; or when the intermediate hidden layers has two hidden layers, an average value of the hidden features corresponding to the two hidden layers is taken as the hidden feature of the intermediate hidden layer, and so on. When the intermediate hidden layer is an odd-numbered layer, the hidden feature obtained by the middlemost hidden layer is taken as the hidden feature of the intermediate hidden layer. When the intermediate hidden layer is an even-numbered layer, the average value of the hidden features of the two middlemost hidden layers is taken as the hidden feature of the intermediate hidden layer.

In a specific embodiment, the operation of "reversely inputting the text word vector into a trained self-encoding neural network model reversely to obtain a hidden feature of an intermediate hidden layer of the self-encoding neural network model", includes:

inputting the text word vector into an output layer of the trained self-encoding neural network model, and inversely generating a hidden feature of the intermediate hidden layer of the self-encoding neural network model by the output layer, and defining the hidden feature as the hidden feature of the intermediate hidden layer of the self-encoding neural network model; and taking the hidden feature corresponding to the middlemost layer of the intermediate hidden layers as the hidden feature of the intermediate hidden layer of the self-encoding neural network model, in response to a determination that the self-encoding neural network model includes an odd number of intermediate hidden layers; or taking an average value of the hidden features corresponding to two middlemost layers of the intermediate hidden layers as the hidden feature of the intermediate hidden layer of the self-encoding neural network model, in response to a determination that the self-encoding neural network model includes an even number of intermediate hidden layers.

The training process of the self-encoding neural network model includes:

Pre-training, a first hidden layer of the self-encoding neural network model is forwardly trained to obtain the parameter of the first hidden layer ($W^1, b^1$) through adopting a training sample without category label. When the self-encoding neural network model includes a plurality of hidden layers, an original input vector is converted into a vector composed by an activation value of a hidden unit by the first hidden layer. Then the vector composed by the activation value of hidden unit is used as an input vector of the second hidden layer. And the input vector of the second hidden layer is trained to obtain the parameter of the second hidden layer ($W^2, b^2$). And the operation of taking an output of a previous layer as an input of a next layer is repeatedly executed to successively train the hidden layers. When the parameter of each layer is trained, the parameters of remaining layers remain unchanged. It is also possible to simultaneously adjust the parameters of all layers through the back-propagation algorithm to improve the results, after the pre-training is completed.

Operation S30: modifying the hidden feature according to a preset classification scale and the classification requirement;

It should be noted that the classification scale generally refers to the scale between the categories. For example, a text category can be divided into two categories, which includes the positive evaluation and the negative evaluation. And the scale between the positive evaluation and the negative evaluation is the classification scale. The classification scale can be predefined or calculated from the samples.

Taking the evaluation text as an example, the evaluation can be divided into the positive evaluation and the negative evaluation. The classification scale of the $i^{-th}$ dimension feature is expressed as $L_i=|h_{1i}-h_{2i}|$, in which $h_{1i}$ is the average value of the hidden features of the positive evaluation sample of the $i^{-th}$ dimension feature, and $h_{2i}$ is the average value of the hidden features of the negative evaluation sample of the $i^{-th}$ dimension feature.

Operation 540: defining the modified hidden feature as the intermediate hidden layer of the self-encoding neural network model, and reversely generating a word vector corresponding to an input layer of the self-encoding neural network model by the intermediate hidden layer;

It should be noted that the modified hidden feature is defined as the intermediate hidden layer of the self-encoding neural network model, and a word vector corresponding to an input layer of the self-encoding neural network model is reversely generated by the intermediate hidden layer. And the word vector is defined as the modified hidden feature and decoded as the input vector of the self-encoding neural network model (Referring to FIG. 3, for example, the self-encoding neural network model includes a single hidden layer, the input layer and the corresponding word vector are obtained by decoding the hidden layer).

Operation 550: generating the corresponding text, according to the generated word vector.

It should be noted that the operation of "generating the corresponding text, according to the generated word vector" is to generate a text through the words corresponding to the generated word vector. The text can be generated through directly connecting the words together, or to form the text through another rules.

In a specific embodiment, the operation of "generating the corresponding text, according to the generated word vector", includes:

Operation 551: matching the generated word vector with a pre-trained word vector library, and generating words each word corresponding to one word vector;

It should be noted that the pre-trained word vector library is a library including the correspondences among the words and the word vectors established in advance according to certain rules.

Operation 552: connecting the generated words together to generate the corresponding text.

It should be noted that text may be generated by directly connecting the words together, or by another rules.

The present disclosure obtains the text word vector and the classification requirement of the statement to be input, and reversely inputs the text word vector into the trained self-encoding neural network model to obtain the hidden feature of the intermediate hidden layer of the self-encoding neural network model. The hidden feature is modified according to the preset classification scale and classification requirement. The modified hidden feature is defined as the intermediate hidden layer of the self-encoding neural network model. The word vector corresponding to the input layer of the self-encoding neural network is reversely generated through the intermediate hidden layer, the text is generated according to the generated word vector. The text generation style is adjusted according to the preset classification scale and the classification requirements, without consuming a large amount of data annotation resources and modeling resources. For example, the user can adjust the style scale of dialog of the customer service robot, such as the positive emotions, the negative emotions, and friendliness, etc.

Figure 4:
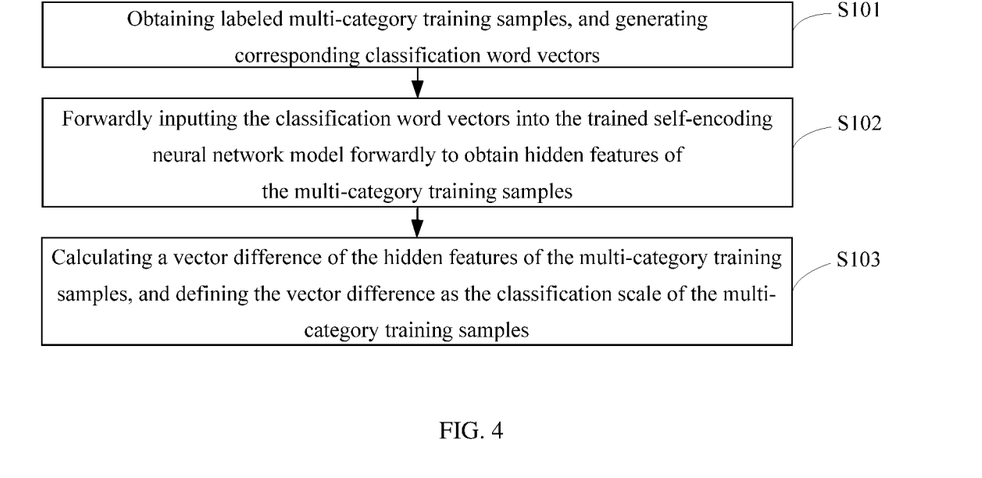
FIG. 4 is a schematic flowchart of a method for generating a text based on a self-encoding neural network according to a second embodiment of the present disclosure.

Referring to FIG. 4, FIG. 4 is a schematic flowchart of a method for generating a text based on a self-encoding neural network according to a second embodiment of the present disclosure.

Based on the first embodiment above-mentioned, in the embodiment, before the operation of S10, the method includes the following operations:

Operation S101: obtaining labeled multi-category training samples, and generating corresponding classification word vectors;

It should be noted that the multi-category training samples refers to that the training samples are divided into multiple categories. Taking the evaluation text as an example, the evaluation samples are divided into two categories which include the positive evaluation text and the negative evaluation text. The multi-category training samples with labels refer to each of the multi-category training samples are labeled respectively (for example, the labels with the positive evaluations or with the negative evaluations).

Operation S102: forwardly inputting the classification word vectors into the trained self-encoding neural network model forwardly to obtain the hidden features of the multi-category training samples;

It should be noted that the operation of reversely inputting the text word vector into a trained self-encoding neural network mode means that the text word vector is configured as the input vector of the trained self-encoding neural network model, and the text word vector is forwardly input into the trained self-encoding neural network model to obtain the hidden feature of the intermediate hidden layer, the hidden feature is configured as the hidden feature of the multi-category training samples (Referring to FIG. 3, FIG. 3 is the situation where the intermediate hidden layer has one hidden layer, the text word vector is input from the output layer to obtain the hidden features of the hidden layer located between the input layer and the output layer). When the self-encoding neural network model has multiple layers, the hidden feature obtained by the middlemost hidden layer of which is taken as the hidden feature of the intermediate hidden layer. For example, when the self-encoding neural network model has three hidden layers, the hidden feature obtained by the second middle layer is taken as the hidden feature of the intermediate hidden layer; or when the self-encoding neural network model has two hidden layers, an average value of the hidden features corresponding to the two middlemost hidden layers is taken as the hidden feature of the intermediate hidden layer.

Operation S103: calculating a vector difference of the hidden features of the multi-category training samples, and defining the vector difference as the classification scale of the multi-category training samples.

It should be noted that the vector difference of the hidden features of the multi-category training samples is calculated, and the vector difference is defined as the classification scale of the corresponding multi-category training sample. Taking the evaluation text as an example, the evaluation can be divided into the positive evaluation and the negative evaluation. The classification scale of the $i^{th}$ dimension feature is expressed as $L_i=|h_{1i}-h_{2i}|$, in which $h_{1i}$ is the average value of the hidden features of the positive evaluation sample of the $i^{th}$ dimension feature, $h_{2i}$ is the average value of the hidden features of the negative evaluation sample of the $i^{th}$ dimension feature.

Figure 5:
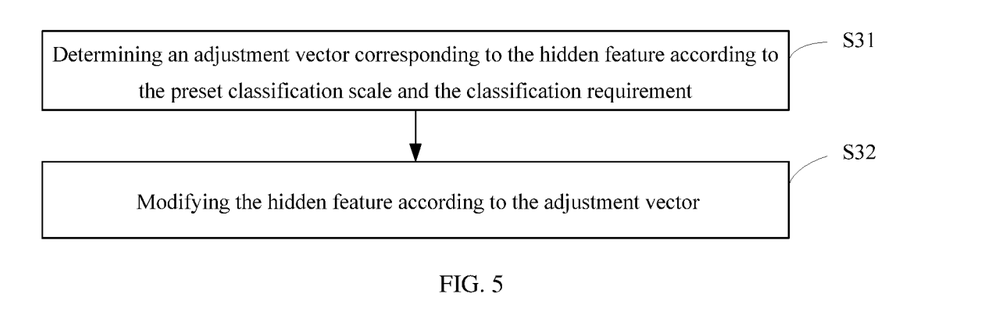
FIG. 5 is a schematic flowchart of a method for generating a text based on a self-encoding neural network according to a third embodiment of the present disclosure.

Referring to FIG. 5, FIG. 5 is a schematic flowchart of a method for generating a text based on a self-encoding neural network according to a third embodiment of the present disclosure.

Based on the second embodiment above-mentioned, in the embodiment, the operation of S30, specifically includes:

Operation S31: determining an adjustment vector corresponding to the hidden feature according to the preset classification scale and the classification requirement;

In a specific embodiment, if the classification scale is regard as L and the classification requirement is an output negative evaluation text, the adjustment vector b can be determined according to the degree of the negative evaluation, and the adjustment vector b is usually adjusted.

Operation S32: modifying the hidden feature according to the adjustment vector.

It should be noted that, the hidden feature is modified according to the adjustment vector. The adjustment vector may be configured as a vector difference between the hidden feature and the adjustment vector, or may be configured as a weight value, so that the modified hidden feature is outputted according to corresponding classification demand.

Figure 6:
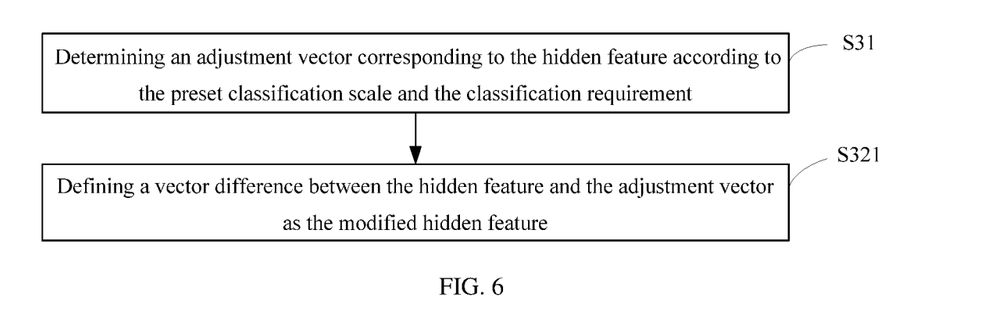
FIG. 6 is a schematic flowchart of a method for generating a text based on a self-encoding neural network according to a fourth embodiment of the present disclosure.

Referring to FIG. 6, FIG. 6 is a schematic flowchart of a method for generating a text based on a self-encoding neural network according to a fourth embodiment of the present disclosure.

Based on the third embodiment above-mentioned, in the embodiment, the operation S32, specifically includes:

Operation S321: defining a vector difference between the hidden feature and the adjustment vector as the modified hidden feature.

In a specific embodiment, the hidden feature before being modified is regarded as $h_{before}$, and the adjustment vector is regarded as b, and the modified hidden feature satisfies a relationship: $h_{before}=h_{after}-b$.

Figure 7:
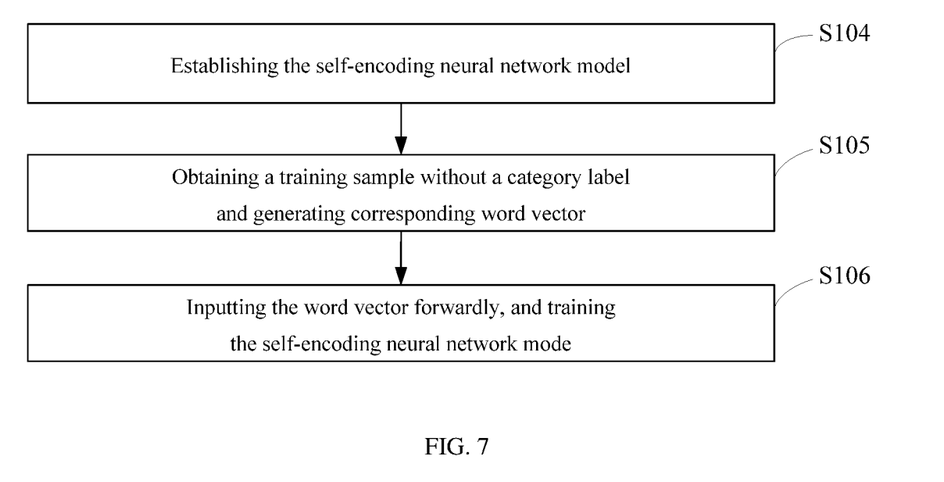
FIG. 7 is a schematic flowchart of a method for generating a text based on a self-encoding neural network according to a fifth embodiment of the present disclosure.

Referring to FIG. 7, FIG. 7 is a schematic flowchart of a method for generating a text based on a self-encoding neural network according to a fifth embodiment of the present disclosure.

Based on the first embodiment above-mentioned, in the embodiment, before the operation of S10, the method further includes:

Operation S104: establishing the self-encoding neural network model;

It should be noted that the self-encoding neural network model is an unsupervised learning neural network that reconstructs the input signal as much as possible. The self-encoding neural network model includes a plurality of intermediate hidden layers or one single intermediate hidden layer. (Referring to FIG. 3).

Operation S105: obtaining a training sample without a category label and generating corresponding word vector;

It should be noted that the training sample without a category label refers to its category is not labeled.

Operation S106: inputting the word vector forwardly, and training the self-encoding neural network model.

In a specific embodiment, a first hidden layer of the self-encoding neural network model is forwardly trained to obtain the parameter of the first hidden layer ($W^1,b^1$) through adopting a training sample without category label. When the self-encoding neural network model includes a plurality of hidden layers, an original input vector is converted into a vector composed by an activation value of a hidden unit by the first hidden layer. Then the vector composed by the activation value of hidden unit is used as an input vector of the second hidden layer. And the input vector of the second hidden layer is trained to obtain the parameter of the second hidden layer ($W^2,b^2$). And the operation of taking an output of a previous layer as an input of a next layer is repeatedly executed to successively train the hidden layers. When the parameter of each layer is trained, the parameters of remaining layers remain unchanged. It is also possible to simultaneously adjust the parameters of all layers through the back-propagation algorithm to improve the results, after the pre-training is completed.

In addition, an embodiment of the present disclosure further provides a computer-readable storage medium, and the computer-readable storage medium may be a non-volatile readable storage medium.

The computer-readable instruction is stored on the computer-readable storage medium, and the computer-readable instruction after executed by the processor performs operations of the method for generating a text based on a self-encoding neural network above-mentioned.

Figure 8:
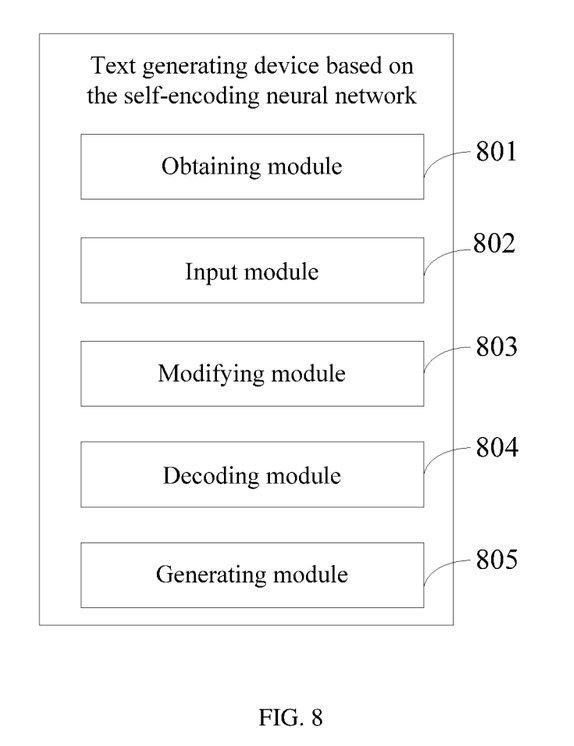
FIG. 8 is a structural block diagram of a device for generating a text based on a self-encoding neural network according to a first embodiment of the present disclosure.

Referring to FIG. 8, FIG. 8 is a structural block diagram of a device for generating a text based on a self-encoding neural network according to a first embodiment of the present disclosure.

Referring to FIG. 8, text generating device based on a self-encoding neural network provided in the embodiment of the present disclosure includes:

an obtaining module 801, configured to obtain a text word vector of a input statement and of a classification requirement;

It should be noted that the classification requirement generally refers to the desired classification category. Taking an evaluation text as an example, which can be divided into two categories that includes a positive evaluation and a negative evaluation. The classification requirements may be an expectation to output the negative evaluation, or an expectation to output the positive evaluation. The classification requirement may be obtained by user-defined input, or may be preset, which is not specifically limited herein.

In a specific embodiment, the operations of "obtaining a text word vector of a statement to be input", specifically includes: obtaining the input statement, preprocessing the input statement and obtaining the text word vector of the preprocessed input statement.

The process of preprocessing the input statement generally includes: removing a stop word. The stop word refers to a word which appears multiple times and has little effect on the text, such as Chinese character "的", "地", "得", etc., or the Hyper Text Markup Language (HTML) tag and the scripting language in the web page data set, etc.

For example, if the input text is doc, the corresponding text word vectors are $\{\omega 1, \omega 2, \ldots \omega i\}$, in which oi is the word vector of the $i^{th}$ word in the statement.

An input module 802, configured to reversely inputting the text word vector into a trained self-encoding neural network model reversely to obtain a hidden feature of an intermediate hidden layer of the self-encoding neural network model;

It should be noted that the operation of reversely inputting the text word vector into a trained self-encoding neural network model to obtain a hidden feature of an intermediate hidden layer of the self-encoding neural network model means that the text word vector is configured as the output vector of the trained self-encoding neural network model to obtain the hidden feature of the intermediate hidden layer reversely (Referring to FIG. 3, FIG. 3 is the situation that the self-encoding neural network model includes one hidden layer, the text word vector is input into the output layer to obtain the hidden feature of the hidden layer located between the input layer and the output layer). When the self-encoding neural network model has multiple hidden layers, the hidden feature obtained of the middlemost hidden layer is taken as the hidden feature of the intermediate hidden layer. For example, when the self-encoding neural network model has three hidden layers, the hidden feature obtained by the second middle layer is taken as the hidden feature of the intermediate hidden layer; or when the intermediate hidden layers has two hidden layers, an average value of the hidden features corresponding to the two hidden layers is taken as the hidden feature of the intermediate hidden layer.

In a specific embodiment, the training process of the self-encoding neural network model includes:

Pre-training, a first hidden layer of the self-encoding neural network model is forwardly trained to obtain the parameter of the first hidden layer ($W^1$,$b^1$) through adopting a training sample without category label. When the self-encoding neural network model includes a plurality of hidden layers, an original input vector is converted into a vector composed by an activation value of a hidden unit by the first hidden layer. Then the vector composed by the activation value of hidden unit is used as an input vector of the second hidden layer. And the input vector of the second hidden layer is trained to obtain the parameter of the second hidden layer ($W^2$,$b^2$). And the operation of taking an output of a previous layer as an input of a next layer is repeatedly executed to successively train the hidden layers. When the parameter of each layer is trained, the parameters of remaining layers remain unchanged. It is also possible to simultaneously adjust the parameters of all layers through the back-propagation algorithm to improve the results, after the pre-training is completed.

A modifying module 803, configured to modify the hidden feature according to a preset classification scale and the classification requirement;

It should be noted that the classification scale generally refers to the scale between the categories. For example, a text category can be divided into two categories, which includes the positive evaluation and the negative evaluation. And the scale between the positive evaluation and the negative evaluation is the classification scale. The classification scale can be predefined or calculated from the samples.

Taking the evaluation text as an example, the evaluation can be divided into the positive evaluation and the negative evaluation. The classification scale of the $i^{-th}$ dimension feature is expressed as $L_i=|h_{1i}-h_{2i}|$, in which $h_{1i}$ is the average value of the hidden features of the positive evaluation sample of the $i^{-th}$ dimension feature, and $h_{2i}$ is the average value of the hidden features of the negative evaluation sample of the $i^{-th}$ dimension feature.

A decoding module 804, configured to define the modified hidden feature as the intermediate hidden layer of the self-encoding neural network model, and reversely generating a word vector corresponding to an input layer of the self-encoding neural network model by the intermediate hidden layer;

It should be noted that the modified hidden feature is defined as the intermediate hidden layer of the self-encoding neural network model, and a word vector corresponding to an input layer of the self-encoding neural network model is reversely generated by the intermediate hidden layer. And the word vector is defined as the modified hidden feature and decoded as the input vector of the self-encoding neural network model (Referring to FIG. 3, for example, the self-encoding neural network model includes a single hidden layer, the input layer and the corresponding word vector are obtained by decoding the hidden layer).

A generating module 805, configured to generate the corresponding text, according to the generated word vector.

It should be noted that the operation of "generating the corresponding text, according to the generated word vector" is to generate a text through the words corresponding to the generated word vector. The text can be generated through directly connecting the words together, or to form the text through another rules.

The present disclosure obtains the text word vector and the classification requirement of the statement to be input, and reversely inputs the text word vector into the trained self-encoding neural network model to obtain the hidden feature of the intermediate hidden layer of the self-encoding neural network model. The hidden feature is modified according to the preset classification scale and classification requirement. The modified hidden feature is defined as the intermediate hidden layer of the self-encoding neural network model. The word vector corresponding to the input layer of the self-encoding neural network is reversely generated through the intermediate hidden layer, the text is generated according to the generated word vector. And the text generation style is adjusted by the preset classification scales and the classification needs, without consuming a large amount of data annotation resources and modeling resources. For example, the user can adjust the style scale of the customer service robot's dialog. And the style scale, such as the positive emotions, the negative emotions, and friendliness, etc.

The other embodiments or specific implementations of the text generating device based on the self-encoding neural network of the present disclosure refer to the embodiments of the method above-mentioned, and the details are not described herein.

It needs to be noted that in the present disclosure, the terms "comprising", "including" or other variants aim to cover non-exclusive inclusion, such that the processes, methods, articles or devices including a series of factors not only include these factors, but also include other factors not listed explicitly, or further comprise include intrinsic for such processes, methods, articles or devices. In the absence of more limitations, the factors limited by "comprising a . . . " do not exclude that additional identical factors are also included in the processes, methods, articles or devices comprising said factors.

The sequence number in the above embodiments of the present disclosure is only for the purpose of explanation and not intended to indicate the merits of the embodiments.

Through above description of the embodiments, it should be understood by a person skilled in the art that the present disclosure may be implemented by means of software in connection with necessary universal hardware platform. Of course, the present disclosure may also be implemented by a hardware. However, in many cases the former is more preferred. Based on this understanding, all or the part contributing to the prior art of the technical solution of the present disclosure may be embodied in the form of software. The computer software may be stored on a storage medium (such as ROM/RAM, diskette, or light disk) and include a plurality of instructions which are used to implement the method as described in the various embodiments of the present disclosure by a terminal device (such as a mobile phone, a computer, a server, an air conditioner, or a network device, etc.)

The foregoing description merely depicts some embodiments of the present application and therefore is not intended to limit the scope of the application. An equivalent structural or flow changes made by using the content of the specification and drawings of the present application, or any direct or indirect applications of the disclosure on any other related fields shall all fall in the scope of the application.

What is claimed is:

1. A method for generating a text based on a self-encoding neural network, comprising:
    obtaining a text word vector and a classification requirement of a statement to be input;
    reversely inputting the text word vector into a trained self-encoding neural network model to obtain a hidden feature of an intermediate hidden layer of the self-encoding neural network model;
    modifying the hidden feature according to a preset classification scale and the classification requirement;
    defining the modified hidden feature as the intermediate hidden layer of the self-encoding neural network model, and reversely generating a word vector corresponding to an input layer of the self-encoding neural network model by the intermediate hidden layer; and
    generating the corresponding text, according to the generated word vector;
    wherein before the operation of "obtaining a text word vector and a classification requirement of a statement to be input", the method further comprises:
    obtaining labeled multi-category training samples, and generating corresponding classification word vectors;
    forwardly inputting the classification word vectors into the trained self-encoding neural network model to obtain hidden features of the multi-category training samples; and
    calculating a vector difference of the hidden features of the multi-category training samples, and defining the vector difference as the classification scale of the multi-category training samples.

2. The method according to claim 1,
    wherein the operation of "modifying the hidden feature according to a preset classification scale and the classification requirement", comprises:
    determining an adjustment vector corresponding to the hidden feature according to the preset classification scale and the classification requirement; and
    modifying the hidden feature according to the adjustment vector.

3. The method according to claim 2,
    wherein the operation of "modifying the hidden feature according to the adjustment vector", comprises:
    defining a vector difference between the hidden feature and the adjustment vector as the modified hidden feature, and
    wherein the hidden feature before being modified is regarded as $h_{before}$, the adjustment vector is regarded as b, and the modified hidden feature satisfies a relationship: $h_{before} = h_{after} - b$.

4. The method according to claim 1,
    wherein in response to a determination that the self-encoding neural network model comprises a plurality of intermediate hidden layers, the operation of "reversely inputting the text word vector into a trained self-encoding neural network model to obtain a hidden feature of an intermediate hidden layer of the self-encoding neural network model", comprises:
    inputting the text word vector into an output layer of the trained self-encoding neural network model, and inversely generating a hidden feature of the intermediate hidden layer of the self-encoding neural network model by the output layer, and defining the hidden feature as the hidden feature of the intermediate hidden layer of the self-encoding neural network model; and
    taking a hidden feature corresponding to a middlemost layer of the intermediate hidden layers as the hidden feature of the intermediate hidden layer of the self-encoding neural network model, in response to a determination that the self-encoding neural network model comprises an odd number of intermediate hidden layers; or
    taking an average value of the hidden features corresponding to two middlemost layers of the intermediate hidden layers as the hidden feature of the intermediate hidden layer of the self-encoding neural network model, in response to a determination that the self-encoding neural network model comprises an even number of intermediate hidden layers.

5. The method according to claim 1,
    wherein before the operation of "obtaining a text word vector and a classification requirement of a statement to be input", the method comprises:

establishing the self-encoding neural network model;
obtaining a training sample without a category label and generating corresponding word vector;
inputting the word vector forwardly, and training the self-encoding neural network model;
wherein the operation of "training the self-encoding neural network model", comprises:
forwardly inputting the word vector, forwardly training a first hidden layer of the self-encoding neural network model;
in response to a determination that the self-encoding neural network model comprises a plurality of hidden layers, converting an original vector input into the self-encoding neural network model into a vector composed by an activation value of a hidden unit by the first hidden layer; defining the vector as an input vector of a second hidden layer; training the input vector of the second hidden layer to obtain a parameter of the second hidden layer; successively training the hidden layers by repeatedly defining an output vector of a previous layer as an input vector of a next layer; and in response to training the parameter of each hidden layer, remaining parameters of remaining layers unchanged.

6. The method according to claim 1,
wherein the operation of "generating the corresponding text, according to the generated word vector", comprises:
matching the generated word vector with a pre-trained word vector library, and generating words each word corresponding to one word vector; and
connecting the generated words together to generate the corresponding text.

7. A terminal, comprising: a processor, a memory, and a computer-readable instruction for generating a text based on a self-encoding neural network, the instruction being stored on the memory and executable on the processor, the instruction being configured to implement following operations:
obtaining a text word vector and a classification requirement of a statement to be input;
reversely inputting the text word vector into a trained self-encoding neural network model to obtain a hidden feature of an intermediate hidden layer of the self-encoding neural network model;
modifying the hidden feature according to a preset classification scale and the classification requirement;
defining the modified hidden feature as the intermediate hidden layer of the self-encoding neural network model, and reversely generating a word vector corresponding to an input layer of the self-encoding neural network model by the intermediate hidden layer; and
generating the corresponding text, according to the generated word vector;
wherein before the operation of "obtaining a text word vector and a classification requirement of a statement to be input", the instruction further being configured to implement following operations:
obtaining labeled multi-category training samples, and generating corresponding classification word vectors;
forwardly inputting the classification word vectors into the trained self-encoding neural network model to obtain hidden features of the multi-category training samples; and
calculating a vector difference of the hidden features of the multi-category training samples, and defining the vector difference as the classification scale of the multi-category training samples.

8. The terminal according to claim 7,
wherein the operation of "modifying the hidden feature according to a preset classification scale and the classification requirement", comprises:
determining an adjustment vector corresponding to the hidden feature according to the preset classification scale and the classification requirement; and
modifying the hidden feature according to the adjustment vector.

9. The terminal according to claim 8,
wherein the operation of "modifying the hidden feature according to the adjustment vector", comprises:
defining a vector difference between the hidden feature and the adjustment vector as the modified hidden feature, and
wherein the hidden feature before being modified is regarded as $h_{before}$, the adjustment vector is regarded as b, and the modified hidden feature satisfies a relationship: $h_{before} = h_{after} - b$.

10. The terminal according to claim 7,
wherein in response to a determination that the self-encoding neural network model comprises a plurality of intermediate hidden layers, the operation of "reversely inputting the text word vector into a trained self-encoding neural network model to obtain a hidden feature of an intermediate hidden layer of the self-encoding neural network model", comprises:
inputting the text word vector into an output layer of the trained self-encoding neural network model, and inversely generating a hidden feature of the intermediate hidden layer of the self-encoding neural network model by the output layer, and defining the hidden feature as the hidden feature of the intermediate hidden layer of the self-encoding neural network model; and
taking a hidden feature corresponding to a middlemost layer of the intermediate hidden layers as the hidden feature of the intermediate hidden layer of the self-encoding neural network model, in response to a determination that the self-encoding neural network model comprises an odd number of intermediate hidden layers; or
taking an average value of the hidden features corresponding to two middlemost layers of the intermediate hidden layers as the hidden feature of the intermediate hidden layer of the self-encoding neural network model, in response to a determination that the self-encoding neural network model comprises an even number of intermediate hidden layers.

11. The terminal according to claim 7,
wherein before the operation of "obtaining a text word vector and a classification requirement of a statement to be input", comprises:
establishing the self-encoding neural network model;
obtaining a training sample without a category label and generating corresponding word vector;
inputting the word vector forwardly, and training the self-encoding neural network model;
wherein the operation of "training the self-encoding neural network model", comprises:
forwardly inputting the word vector, forwardly training a first hidden layer of the self-encoding neural network model;
in response to a determination that the self-encoding neural network model comprises a plurality of hidden layers, converting an original vector input into the self-encoding neural network model into a vector composed by an activation value of a hidden unit by the first hidden layer; defining the vector as an input vector of a second hidden layer; training the input vector of the second hidden layer to obtain a parameter of the second hidden layer; successively training the hidden layers by repeatedly defining an output vector of a previous layer as an input vector of a next layer; and in response to training the parameter of each hidden layer, remaining parameters of remaining layers unchanged.

12. The terminal according to claim 7,
wherein the operation of "generating the corresponding text, according to the generated word vector", comprises:
matching the generated word vector with a pre-trained word vector library, and generating words each word corresponding to one word vector; and
connecting the generated words together to generate the corresponding text.

13. A non-transitory computer-readable storage medium, storing a computer-readable instruction for generating a text based on a self-encoding neural network, and the instruction implementing following operations when being executed by a processor:
obtaining a text word vector and a classification requirement of a statement to be input;
reversely inputting the text word vector into a trained self-encoding neural network model to obtain a hidden feature of an intermediate hidden layer of the self-encoding neural network model;
modifying the hidden feature according to a preset classification scale and the classification requirement;
defining the modified hidden feature as the intermediate hidden layer of the self-encoding neural network model, and reversely generating a word vector corresponding to an input layer of the self-encoding neural network model by the intermediate hidden layer; and
generating the corresponding text, according to the generated word vector;
wherein before the operation of "obtaining a text word vector and a classification requirement of a statement to be input", the instruction further implementing following operations:
obtaining labeled multi-category training samples, and generating corresponding classification word vectors;
forwardly inputting the classification word vectors into the trained self-encoding neural network model to obtain hidden features of the multi-category training samples; and
calculating a vector difference of the hidden features of the multi-category training samples, and defining the vector difference as the classification scale of the multi-category training samples.

14. The non-transitory computer-readable storage medium of claim 13,
wherein the operation of "modifying the hidden feature according to a preset classification scale and the classification requirement", comprises:
determining an adjustment vector corresponding to the hidden feature according to the preset classification scale and the classification requirement; and
modifying the hidden feature according to the adjustment vector.

15. The non-transitory computer-readable storage medium of claim 14,
wherein the operation of "modifying the hidden feature according to the adjustment vector", comprises:
defining a vector difference between the hidden feature and the adjustment vector as the modified hidden feature, and
wherein the hidden feature before being modified is regarded as $h_{before}$, the adjustment vector is regarded as b, and the modified hidden feature satisfies a relationship: $h_{before}=h_{after}-b$.

16. The non-transitory computer-readable storage medium of claim 13,
wherein in response to a determination that the self-encoding neural network model comprises a plurality of intermediate hidden layers, the operation of "reversely inputting the text word vector into a trained self-encoding neural network model to obtain a hidden feature of an intermediate hidden layer of the self-encoding neural network model", comprises:
inputting the text word vector into an output layer of the trained self-encoding neural network model, and inversely generating a hidden feature of the intermediate hidden layer of the self-encoding neural network model by the output layer, and defining the hidden feature as the hidden feature of the intermediate hidden layer of the self-encoding neural network model; and
taking a hidden feature corresponding to a middlemost layer of the intermediate hidden layers as the hidden feature of the intermediate hidden layer of the self-encoding neural network model, in response to a determination that the self-encoding neural network model comprises an odd number of intermediate hidden layers; or
taking an average value of the hidden features corresponding to two middlemost layers of the intermediate hidden layers as the hidden feature of the intermediate hidden layer of the self-encoding neural network model, in response to a determination that the self-encoding neural network model comprises an even number of intermediate hidden layers.

17. The non-transitory computer-readable storage medium of claim 13,
wherein before the operation of "obtaining a text word vector and a classification requirement of a statement to be input", comprises:
establishing the self-encoding neural network model;
obtaining a training sample without a category label and generating corresponding word vector;
inputting the word vector forwardly, and training the self-encoding neural network model;
wherein the operation of "training the self-encoding neural network model", comprises:
forwardly inputting the word vector, forwardly training a first hidden layer of the self-encoding neural network model;
in response to a determination that the self-encoding neural network model comprises a plurality of hidden layers, converting an original vector input into the self-encoding neural network model into a vector composed by an activation value of a hidden unit by the first hidden layer; defining the vector as an input vector of a second hidden layer; training the input vector of the second hidden layer to obtain a parameter of the second hidden layer; successively training the hidden layers by repeatedly defining an output vector of a previous layer as an input vector of a next layer; and in response to training the parameter of each hidden layer, remaining parameters of remaining layers unchanged.

* * * * *